(12) United States Patent
Niwa

(10) Patent No.: US 9,701,186 B2
(45) Date of Patent: Jul. 11, 2017

(54) VEHICLE

(71) Applicant: Toyota Jidosha Kabushiki Kaisha, Toyota-shi, Aichi-ken (JP)

(72) Inventor: Yamato Niwa, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 15/134,650

(22) Filed: Apr. 21, 2016

(65) Prior Publication Data

US 2016/0311304 A1    Oct. 27, 2016

(30) Foreign Application Priority Data

Apr. 23, 2015   (JP) ................. 2015-088426

(51) Int. Cl.
| | |
|---|---|
| *B60L 9/00* | (2006.01) |
| *B60K 6/26* | (2007.10) |
| *B60K 6/24* | (2007.10) |
| *B60K 6/28* | (2007.10) |
| *B60W 10/06* | (2006.01) |
| *B60W 10/08* | (2006.01) |
| *B60W 20/13* | (2016.01) |

(52) U.S. Cl.
CPC ............. *B60K 6/26* (2013.01); *B60K 6/24* (2013.01); *B60K 6/28* (2013.01); *B60W 10/06* (2013.01); *B60W 10/08* (2013.01); *B60W 20/13* (2016.01); *B60W 2400/00* (2013.01); *B60W 2510/244* (2013.01); *Y02T 10/7005* (2013.01); *Y10S 903/905* (2013.01); *Y10S 903/906* (2013.01); *Y10S 903/907* (2013.01)

(58) Field of Classification Search
USPC ........................................... 701/22
See application file for complete search history.

(56) References Cited

U.S. PATENT DOCUMENTS

| | | | |
|---|---|---|---|
| 2007/0274109 A1* | 11/2007 | Oyobe | B60K 6/26 363/37 |
| 2008/0251304 A1* | 10/2008 | Birke | B60L 11/12 180/65.265 |

(Continued)

FOREIGN PATENT DOCUMENTS

| | | |
|---|---|---|
| JP | 2001-231103 A | 8/2001 |
| JP | 2007-236023 A | 9/2007 |
| JP | 2013-051772 A | 3/2013 |

*Primary Examiner* — Tyler Paige
(74) *Attorney, Agent, or Firm* — Dinsmore & Shohl LLP

(57) ABSTRACT

A fuel remaining amount is recognized by a control device by a discrete numerical value. In a period that continues until execution of only the electric power supply in which the engine is stopped after the electric power supply is initiated (time is to t1), that is, in a period when no SOC recovery history is generated, the control device calculates an electric power supply possible time Tsp with a sum of an electric power generation possible time Tgs based on a fuel remaining amount detection value FLV# and a discharging possible time Tel based on the SOC. In a period subsequent to the generation of the SOC recovery history attributable to starting of the engine (after time t0), the electric power supply possible time Tsp is calculated in accordance with the electric power generation possible time Tgs without the SOC being reflected.

6 Claims, 6 Drawing Sheets

(56) References Cited

U.S. PATENT DOCUMENTS

| | | | |
|---|---|---|---|
| 2011/0029170 A1* | 2/2011 | Hyde | B60W 50/082 |
| | | | 701/22 |
| 2011/0166733 A1* | 7/2011 | Yu | B60K 6/445 |
| | | | 701/22 |
| 2012/0016546 A1* | 1/2012 | Nilssen | H02J 9/062 |
| | | | 701/22 |
| 2014/0002011 A1* | 1/2014 | Ang | B60L 11/1838 |
| | | | 320/107 |
| 2014/0002024 A1* | 1/2014 | Ang | H02J 7/0036 |
| | | | 320/109 |
| 2014/0232182 A1 | 8/2014 | Kinomura et al. | |
| 2015/0141198 A1* | 5/2015 | Tomo | B60W 10/02 |
| | | | 477/5 |
| 2015/0191164 A1* | 7/2015 | Kinomura | B60W 10/08 |
| | | | 701/22 |
| 2016/0089981 A1* | 3/2016 | Kodawara | B60L 1/003 |
| | | | 307/10.1 |
| 2016/0121875 A1* | 5/2016 | Aikawa | B60W 10/08 |
| | | | 701/22 |
| 2016/0311304 A1* | 10/2016 | Niwa | B60K 6/26 |

* cited by examiner

VEHICLE

CROSS-REFERENCE TO RELATED APPLICATIONS

The present disclosure claims priority to Japanese Patent Application No. 2015-088426 filed on Apr. 23, 2015, which is herein incorporated by reference in its entirety including the specification, drawings and abstract.

BACKGROUND

1. Technical Field

The present disclosure relates to a vehicle and, more particularly, to a vehicle that has a mode in which electric power supply involving an engine operation is performed.

2. Description of Related Art

In recent years, a concept of electric power supply from a vehicle to general electrical instruments outside the vehicle in which the vehicle is regarded as an electric power supply source has been studied as seen in a smart grid and the like with regard to vehicles such as a hybrid car and an electric car in which an electric power storage device with a relatively large capacity is mounted. In some cases, the vehicle is used as an electric power source for a case where an electrical instrument is used during camping, an outdoor operation, or the like.

For example, Japanese Patent Application Publication No. 2007-236023 (JP 2007-236023 A) and Japanese Patent Application Publication No. 2013-051772 (JP 2013-051772 A) disclose configurations for electric power supply to the outside of a hybrid vehicle over a long period of time by the use of electric power generated by driving of an engine as well as electric power of the electric power storage device. In JP 2007-236023 A, in particular, calculation and display of an electric power supply possible time in a case where the current use of electric power by an electric load continues during the electric power supply from the vehicle are disclosed.

In addition, Japanese Patent Application Publication No. 2001-231103 discloses calculation of a travelable distance and a travelable time of a hybrid car based on a generatable electric power amount based on a fuel remaining amount and a dischargeable electric power amount based on a battery charging level.

In a vehicle that has a mode in which electric power supply involving an engine operation is performed as in JP 2007-236023 A and JP 2013-051772 A, the electric power supply possible time is calculated based on the engine fuel remaining amount and a remaining capacity of the electric power storage device (that is, a state of charge (SOC)).

During the electric power supply involving the engine operation, however, the SOC of the electric power storage device rises when the generated electric power that involves fuel consumption exceeds the electric power that is supplied. Accordingly, in a case where the fuel remaining amount is recognized as a discrete numerical value during the calculation of the electric power supply possible time, a case might arise where the recognized value of the SOC of the electric power storage device rises with the recognized value of the fuel remaining amount remaining constant depending on a resolution of the discrete numerical value. In this case, an unreasonable calculation result is obtained in the form of an increase in the electric power supply possible time with the progress of the electric power supply, with which a user might feel uncomfortable. In addition, an inconvenient control operation might be caused in a case where the operation for the electric power supply from the vehicle is controlled based on the utilization of the calculated electric power supply possible time.

SUMMARY

The present disclosure provides a vehicle that has a mode in which electric power supply involving an engine operation is performed and allows an electric power supply possible time in an electric power supply mode to be appropriately calculated.

According to an aspect of the present disclosure, a vehicle having an electric power supply mode includes an electric power storage device, an internal combustion engine, a fuel tank, a fuel gauge, an electric power generation mechanism, an electric power converter, an electric power node, and a control device. The internal combustion engine is configured to generate power by combustion of a fuel. The fuel tank is configured to store the fuel. The fuel gauge is configured to detect the amount of the fuel remaining in the fuel tank. The electric power converter is configured to convert electric power from at least one of the electric power storage device and the electric power generation mechanism to supply electric power in the electric power supply mode. The electric power node is configured to output the supply electric power from the electric power converter. The control device is configured to put the internal combustion engine into operation and control the operation of the internal combustion engine for electric power supply to continue once an SOC of the electric power storage device is reduced to a first reference value during the electric power supply in which the internal combustion engine is stopped in the electric power supply mode. In addition, the control device is configured to calculate an electric power supply possible time based on a fuel remaining amount value recognized as a discrete numerical value based on an output of the fuel gauge and the SOC in a first period between an initiation of the electric power supply and generation of a recovery history in the SOC resulting from charging of the electric power storage device with the electric power from the electric power generation mechanism attributable to the operation of the internal combustion engine in the electric power supply mode. The control device calculates the electric power supply possible time based on the remaining amount value without taking the SOC into account after the generation of the recovery history.

According to the above-described vehicle, a discharging possible time that reflects a change in the SOC which results from fuel consumption can be excluded from the electric power supply possible time in a second period subsequent to the generation of the SOC recovery history. Accordingly, even in a case where a resolution of the value of the fuel remaining amount recognized by the control device is coarse, the inconvenience of a fluctuation of the electric power supply possible time can be resolved. As a result, the electric power supply possible time can be appropriately calculated for the calculated value of the electric power supply possible time not to increase while the electric power supply continues.

In some embodiments, the control device may be configured to control the operation of the internal combustion engine for the electric power supply to continue with the internal combustion engine stopped once the SOC of the electric power storage device rises to a second reference value higher than the first reference value during the electric power supply involving the operation of the internal combustion engine.

Then, the electric power supply involving the operation of the internal combustion engine (HV electric power supply) or the electric power supply in which the internal combustion engine is stopped (EV electric power supply) can be selected such that the electric power storage device is not over-discharged or overcharged in the electric power supply mode.

In some embodiments, the control device may detect the recovery history based on an operation history of the internal combustion engine starting from the initiation of the electric power supply.

Then, a start timing for the exclusion of the discharging possible time based on the SOC from the electric power supply possible time can be set in a simplified manner in accordance with the operation history of the internal combustion engine.

In some embodiments, the control device may be configured to detect the recovery history based on the presence or absence of a history of the SOC changing from a decrease to an increase in the electric power supply mode. Alternatively, the control device may be configured to detect the recovery history based on the presence or absence of a history of the SOC being reduced to a predetermined value determined in correlation with the first reference value in the electric power supply mode.

Then, a start timing for the exclusion of the discharging possible time based on the SOC from the electric power supply possible time can be appropriately set in accordance with the history of the actual SOC.

In some embodiments, the vehicle further includes an indicator. The indicator may be configured to display the electric power supply possible time calculated by the control device in a manner in which a user is capable of viewing the electric power supply possible time.

Then, the user's discomfort can be prevented by the electric power supply possible time displayed by the indicator.

According to the present disclosure, the electric power supply possible time during the electric power supply can be appropriately calculated in the vehicle that has the mode in which the electric power supply involving the engine operation is performed.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Figure 1:
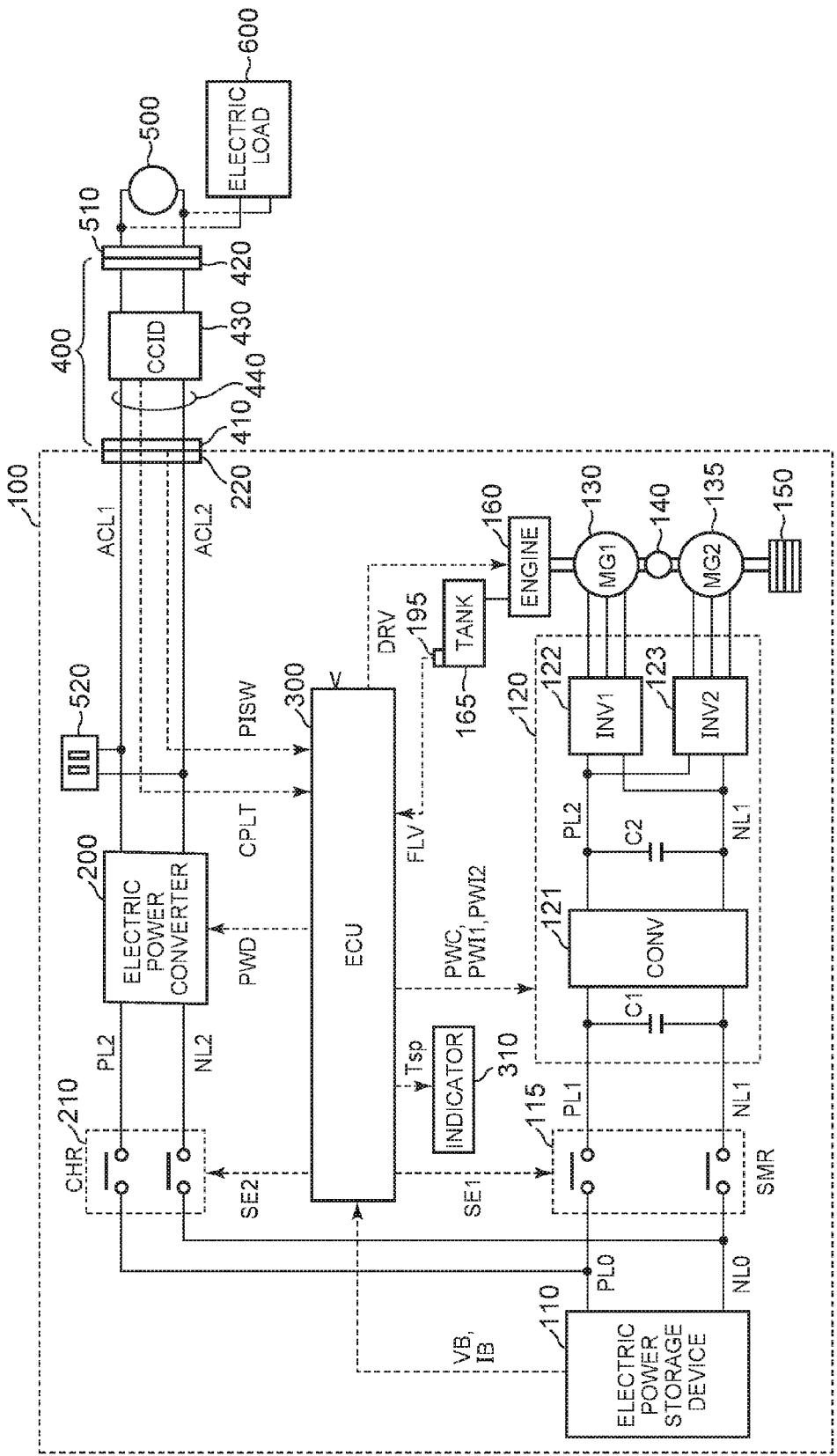
FIG. 1 is an overall block diagram of a vehicle according to this embodiment.

Hereinafter, an embodiment of the present disclosure will be described in detail with reference to accompanying drawings. The same reference numerals will be used to refer to the same or corresponding parts in the drawings, and description thereof will not be repeated in principle.

(Configuration and Operation of Vehicle)

FIG. 1 is an overall block diagram of a vehicle 100 according to this embodiment.

Referring to FIG. 1, the vehicle 100 is provided with an electric power storage device 110, a system main relay (SMR) 115, a power control unit (PCU) 120, motor generators 130, 135, a power transmission gear 140, a driving wheel 150, an engine 160 that is an internal combustion engine, and an electronic control unit (ECU) 300 that is a control device. The PCU 120 includes a converter 121, inverters 122, 123, and capacitors C1, C2.

The electric power storage device 110 is an electric power storage element that is configured to be rechargeable. For example, the electric power storage device 110 is configured to include a secondary battery such as a lithium-ion battery, a nickel-hydrogen battery, and a lead storage battery or an electric power storage element such as an electric double layer capacitor.

The electric power storage device 110 is connected to an electric power line PL0 and a grounding wire NL0. The SMR 115 includes a relay that is connected between the electric power line PL0 and an electric power line PL1 and a relay that is connected between the grounding wire NL0 and a grounding wire NL1. The SMR 115 switches between electric power supply and interruption between the electric power storage device 110 and the PCU 120 based on a control signal SE1 from the ECU 300.

The electric power storage device 110 supplies the PCU 120 with electric power for generating a driving force for the vehicle 100. In addition, the electric power storage device 110 stores electric power that is generated by the motor generators 130, 135. As described above, the electric power storage device 110 is configured to exchange electric power with the motor generators 130, 135 that are electric motors for driving the vehicle. Accordingly, the electric power storage device 110 has a relatively large capacity. For example, an output of the electric power storage device 110 is approximately 200 V. The electric power storage device 110 includes a voltage sensor (not illustrated) and a current sensor (not illustrated). The electric power storage device 110 outputs, to the ECU 300, a voltage VB and a current IB of the electric power storage device 110 that are detected by these sensors.

The converter 121 performs voltage conversion between the electric power line PL1 and the grounding wire NL1 and an electric power line PL2 and the grounding wire NL1 based on a control signal PWC from the ECU 300.

The inverters 122, 123 are connected in parallel to the electric power line PL2 and the grounding wire NL1. The inverters 122, 123 convert DC electric power supplied from the converter 121 to AC electric power and drive the motor generators 130, 135 based on control signals PWI1, PWI2 from the ECU 300, respectively.

The capacitor C1 is disposed between the electric power line PL1 and the grounding wire NL1. The capacitor C1 decreases a voltage fluctuation between the electric power line PL1 and the grounding wire NL1. The capacitor C2 is disposed between the electric power line PL2 and the grounding wire NL1. The capacitor C2 decreases a voltage fluctuation between the PL2 and the grounding wire NL1.

The motor generators 130, 135 are AC rotating electric machines. For example, the motor generators 130, 135 are permanent magnet-type synchronous electric motors provided with permanent magnet-embedded rotors.

The engine 160 is an internal combustion engine. For example, a gasoline engine, a diesel engine, or the like constitutes the engine 160. The engine 160 outputs power by converting thermal energy resulting from combustion of a fuel stored in a fuel tank 165 to kinetic energy of a mover such as a piston and a rotor. A fuel gauge 195 that detects a fuel remaining amount is disposed in the fuel tank 165.

Power (torque) that is output from the motor generators 130, 135 is transmitted to the driving wheel 150 via the power transmission gear 140 that is configured to include a decelerator and a power split mechanism and causes the vehicle 100 to travel. During a regenerative braking operation of the vehicle 100, the motor generators 130, 135 can generate electric power with a turning force of the driving wheel 150. The generated electric power is converted by the PCU 120 to charging electric power of the electric power storage device 110.

In addition, the motor generators 130, 135 are coupled with the engine 160 via the power transmission gear 140. The driving force of the vehicle 100 is generated by the motor generators 130, 135 and the engine 160 being operated in cooperation with each other by the ECU 300.

The motor generator 130 can generate electric power with rotation of the engine 160, and the generated electric power can be converted by the PCU 120 to the charging electric power of the electric power storage device 110. In other words, the motor generator 130 and the PCU 120 can constitute an "electric power generation mechanism" that generates electric power with the power from the engine 160.

The vehicle 100 includes an electric power converter 200, a charging relay (CHR) 210, and an inlet 220 as configurations for externally charging the electric power storage device 110 with electric power from an electric power source 500 outside the vehicle 100 (hereinafter, also referred to as an "external electric power source").

A cable connector 410 of an electric power cable 400 is connected to the inlet 220. The inlet 220 can function as an electrical contact to the outside of the vehicle when the electric power cable 400 is connected.

The electric power cable 400 includes not only the cable connector 410 but also a plug 420 for connection to an electrical outlet 510 of the external electric power source 500 and an electric power line 440 for connection between the cable connector 410 and the plug 420. A charging circuit interrupt device (hereinafter, also referred to as a COD) 430 for switching between supply and interruption of the electric power from the external electric power source 500 is interposed in the electric power line 440.

The electric power converter 200 executes electric power conversion between electric power lines ACL1, ACL2 that transmit AC electric power and the electric power line PL2 and a grounding wire NL2 that transmit DC electric power. The electric power lines ACL1, ACL2 are connected to the inlet 220. The electric power line PL2 and the grounding wire NL2 are connected, via the CHR 210, to the electric power line PL0 and the grounding wire NL1 connected to the electric power storage device 110.

The electric power converter 200 is controlled by a control signal PWD from the ECU 300 and converts AC electric power supplied from the inlet 220 to the charging electric power of the electric power storage device 110. In addition, as described below, the electric power converter 200 can convert DC electric power from the electric power storage device 110 or DC electric power generated by the motor generators 130, 135 and converted by the PCU 120 to AC electric power and supply the electric power to the outside of the vehicle. The electric power converter 200 may be a single device that is capable of the two-way electric power conversion of charging and electric power supply or may include separate devices for charging and electric power supply.

The CHR 210 is controlled by a control signal SE2 from the ECU 300 and switches between electric power supply and interruption between the electric power converter 200 and the electric power storage device 110.

The ECU 300 includes a central processing unit (CPU), a storage device, and an I/O buffer (neither of which is illustrated herein). The ECU 300 performs signal inputs from respective sensors or the like and control signal outputs to respective instruments, and controls respective instruments of the electric power storage device 110 and the vehicle 100. These controls are not limited to software-based processing and can be processing using dedicated hardware (electronic circuit).

An indicator 310 is configured to be capable of displaying information, in a manner in which a user can view the information, based on a command from the ECU 300. For example, the indicator 310 is configured to have a liquid crystal dot matrix screen.

The ECU 300 calculates a state of charge (SOC) of the electric power storage device 110 based on detected values of the voltage VB and the current IB from the electric power storage device 110. As is known, the SOC is a current electric power storage amount with respect to an electric power storage amount in a fully charged state shown as a percentage. The SOC can be calculated by any known method.

The ECU 300 receives, from the cable connector 410, a signal PISW that shows a connection state of the electric power cable 400. In addition, the ECU 300 receives a pilot signal CPLT from the CCID 430 of the electric power cable 400. The ECU 300 can detect the connection state of the electric power cable 400, whether or not a normal electrical connection to the outside of the vehicle (such as the electrical outlet 510) is formed in particular, with the signal PISW and the pilot signal CPLT.

According to the configuration that is illustrated in FIG. 1, a single control device is disposed as the ECU 300. However, for example, another configuration may be adopted as well in which separate control devices are disposed for different functions or different instruments to be controlled, examples of which include a control device for the PCU 120 and a control device for the electric power storage device 110.

A value that is detected by the fuel gauge 195 is also input to the ECU 300. In this embodiment, the ECU 300 recognizes the amount of the fuel remaining in the fuel tank 165 by a discrete numerical value. In the following description, the value of the fuel remaining amount recognized by the ECU 300 will be referred to as a fuel remaining amount detection value FLV. In other words, the fuel remaining amount detection value FLV does not reflect a fuel remaining amount fluctuation less than a resolution of the discrete numerical value. The fuel remaining amount detection value FLV may be a digital value that is output from the fuel gauge 195 or may be obtained by the ECU 300 performing A/D conversion on an analog value from the fuel gauge 195.

The vehicle 100 has a charging mode in which the electric power storage device 110 is charged with the electric power from the external electric power source 500 in a state where the inlet 220 is electrically connected to the external electric power source 500 by the electric power cable 400. In the charging mode, the ECU 300 turns ON the CHR 210 and controls an operation of the electric power converter 200 by the control signal PWD so that the AC electric power input from the external electric power source 500 to the inlet 220 is converted to the charging electric power of the electric power storage device 110.

With regard to the vehicle 100 that is capable of forming an electric power path to and from the outside of the vehicle by using the electric power cable 400, a concept of electric power supply from the vehicle to general electrical instruments outside the vehicle based on the vehicle functioning as an electric power supply source has been studied as seen in a smart grid and the like. In some cases, the vehicle is used as an electric power source for a case where an electrical instrument is used during camping, an outdoor operation, or the like. Accordingly, the vehicle 100 according to this embodiment is configured to have an additional electric power supply mode for supplying an AC electric power source equivalent to the external electric power source 500. Details of the electric power supply mode will be described later.

In the electric power supply mode and an electric power generation mode, the ECU 300 prohibits the traveling of the vehicle 100. During the traveling of the vehicle 100, the ECU 300 forms a state, by turning ON the SMR 115, where the motor generators 130, 135 can be driven by the electric power of the electric power storage device 110. In addition, the ECU 300 generates the vehicle driving force for the traveling by causing the motor generators 130, 135 and the engine 160 to be operated in cooperation with each other.

(Control in Electric Power Supply Mode)

In the electric power supply mode, the vehicle 100 typically supplies AC electric power to the outside of the vehicle in a state where the inlet 220 is electrically connected to the electrical outlet 510 by the electric power cable 400. Then, electric power can be supplied from the vehicle 100 to an electric load 600 that is electrically connected to the electrical outlet 510. In general, the external electric power source 500, the electric load 600, and the electrical outlet 510 are electrically connected via a distribution board (not illustrated) although this is not illustrated in FIG. 1 in the interest of simplicity. Accordingly, an operation for transmitting the electric power from the external electric power source 500 to the vehicle 100 and an operation for transmitting the electric power supplied from the vehicle 100 to the electric load 600 can be performed by the use of the same electrical outlet 510 by the distribution board being controlled.

In the electric power supply mode, the ECU 300 turns ON the CHR 210 and controls a DC/AC conversion operation of the electric power converter 200 by the control signal PWD so that the DC electric power that is transmitted from the electric power line PL0 and the grounding wire NL0 to the electric power line PL2 and the grounding wire NL2 is converted to AC electric power equivalent to the external electric power source 500. In this manner, the vehicle 100 can supply AC electric power from the inlet 220 to the outside of the vehicle. In other words, the inlet 220 corresponds to an example of an "electric power node".

Alternatively, the vehicle 100 may be configured to be provided with an electrical outlet 520 for outputting AC electric power on the electric power lines ACL1, ACL2. The electrical outlet 520 may be disposed in a passenger compartment or may be disposed outside the passenger compartment (body). Then, the AC electric power from the electric power converter 200 can also be supplied to an electrical instrument connected to the electrical outlet 520 in the electric power supply mode. In other words, the electrical outlet 520 can constitute an "electric power node" that outputs supply electric power.

In a case where a disaster such as an earthquake occurs and electricity as a life line becomes unavailable, the vehicle 100 that has the electric power supply mode can function as an independent electric power source. In a case where the vehicle is an electric car in this case, only the electric power of the electric power storage device 110 can be used for electric power supply, and thus ensuring an electric power supply possible time in the electric power supply mode is limited. Meanwhile, a hybrid vehicle in which both the electric power storage device 110 and the engine 160 are mounted as is the case with the vehicle 100 illustrated in FIG. 1 can supply electric power by making more use of the electric power which is generated by the engine 160 being put into operation. Accordingly, electric power supply over a relatively long period of time can be anticipated.

Accordingly, in the electric power supply mode of the vehicle 100, electric power supply based solely on discharging from the electric power storage device 110 with the engine 160 stopped (hereinafter, also referred to as "EV electric power supply") or electric power supply involving electric power generation attributable to the operation of the engine 160 (hereinafter, also referred to as "HV electric power supply") is selected. In the electric power supply mode, both the SMR 115 and the CHR 210 are turned ON.

During the HV electric power supply, the ECU 300 generates an operation command DRV so as to put the engine 160 into operation. In addition, with respect to the PCU 120, the ECU 300 generates the control signals PWC, PWI1, PWI2 so that the motor generator 130 generates electric power with the power from the engine 160 and this generated electric power is converted to the charging electric power of the electric power storage device 110.

During the EV electric power supply, the ECU 300 generates the operation command DRV, PWC, PWI1, PWI2 so that the engine 160 and the PCU 120 are stopped.

During the HV electric power supply, the engine 160 selects a high-efficiency operation point, and is operated basically with a constant output. Accordingly, in general, the electric power that is generated by the engine 160 is substantially constant during the HV electric power supply regardless of the electric power that is supplied from the inlet 220 and/or the electrical outlet 250.

Accordingly, in a case where the electric power that is generated by the engine 160 exceeds the electric power that is supplied from the vehicle 100, the electric power storage device 110 is charged with the electric power surplus. In other words, during the HV electric power supply in the electric power supply mode, the SOC of the electric power storage device 110 might rise.

Figure 2:
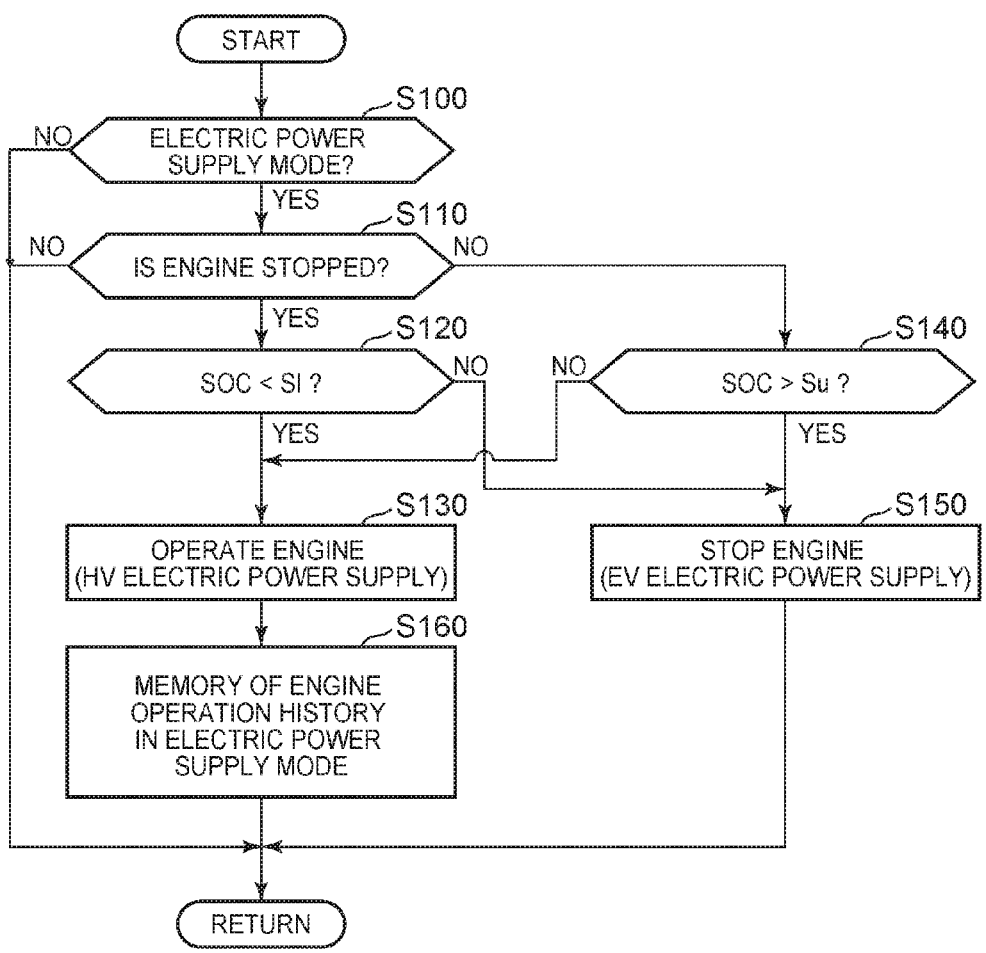
FIG. 2 is a flowchart for showing a control for selecting HV electric power supply or EV electric power supply in an electric power supply mode of the vehicle according to this embodiment.

FIG. 2 is a flowchart showing a control for selecting the HV electric power supply or the EV electric power supply in the electric power supply mode of the vehicle 100.

Referring to FIG. 2, the ECU 300 determines in Step S100 whether or not the current mode is the electric power supply mode. Provided that the current mode is the electric power supply mode, the ECU 300 repeatedly executes the operations of the following Steps S110 to S160. For example, a YES determination is made in Step S100 in a case where the electric power cable 400 is in a normal connection state and the electric power supply mode is designated by the user. Still, a NO determination is made in Step S100 in a case where electric power supply is impossible due to a shortage of the SOC of the electric power storage device 110 and the amount of the fuel remaining in the fuel tank 165 and in a case where electric power supply is impossible due to the occurrence of an abnormality in an instrument for the electric power supply.

When the current mode is the electric power supply mode (when a YES determination is made in S100), the ECU 300 allows the processing to proceed to Step S110 and checks whether or not the engine 160 is stopped. During the EV electric power supply in which the engine is stopped (when a YES determination is made in S110), the ECU 300 allows the processing to proceed to Step S120 and compares the SOC of the electric power storage device 110 to a reference value S1. The reference value S1 corresponds to a "first reference value".

When the SOC falls short of the S1 (when a YES determination is made in S120), the ECU 300 instructs the engine 160 to be put into operation in Step S130. Then, switching from the EV electric power supply to the HV electric power supply is executed by the engine 160 in the stationary state being started.

When the SOC is at least the S1 (when a NO determination is made in S120), the ECU 300 instructs the engine 160 to be stopped in Step S150. Then, the engine 160 remains stopped and the EV electric power supply continues.

In contrast, during the operation of the engine 160 (when a NO determination is made in S110), that is, during the HV electric power supply, the ECU 300 allows the processing to proceed to Step S140 and compares an SOC estimate value to a reference value Su. The reference value Su corresponds to a "second reference value" and the Su is set to exceed the S1.

When the SOC exceeds the Su (when a YES determination is made in S140), the ECU 300 instructs the engine 160 to be stopped in Step S150. Then, switching from the HV electric power supply to the EV electric power supply is executed by the engine 160 in operation being stopped.

When the Su is at least the SOC (when a NO determination is made in S140), the ECU 300 instructs the engine 160 to be put into operation in Step S130. Then, the engine 160 remains in operation and the HV electric power supply continues.

In addition, during the operation of the engine 160, the ECU 300 stores an operation history of the engine 160 in the electric power supply mode in Step S160. Then, the ECU 300 can detect whether or not the engine 160 was operated until the present point in time after the initiation of the electric power supply in the electric power supply mode, that is, the presence or absence of a history of the selection of the HV electric power supply.

Figure 3:
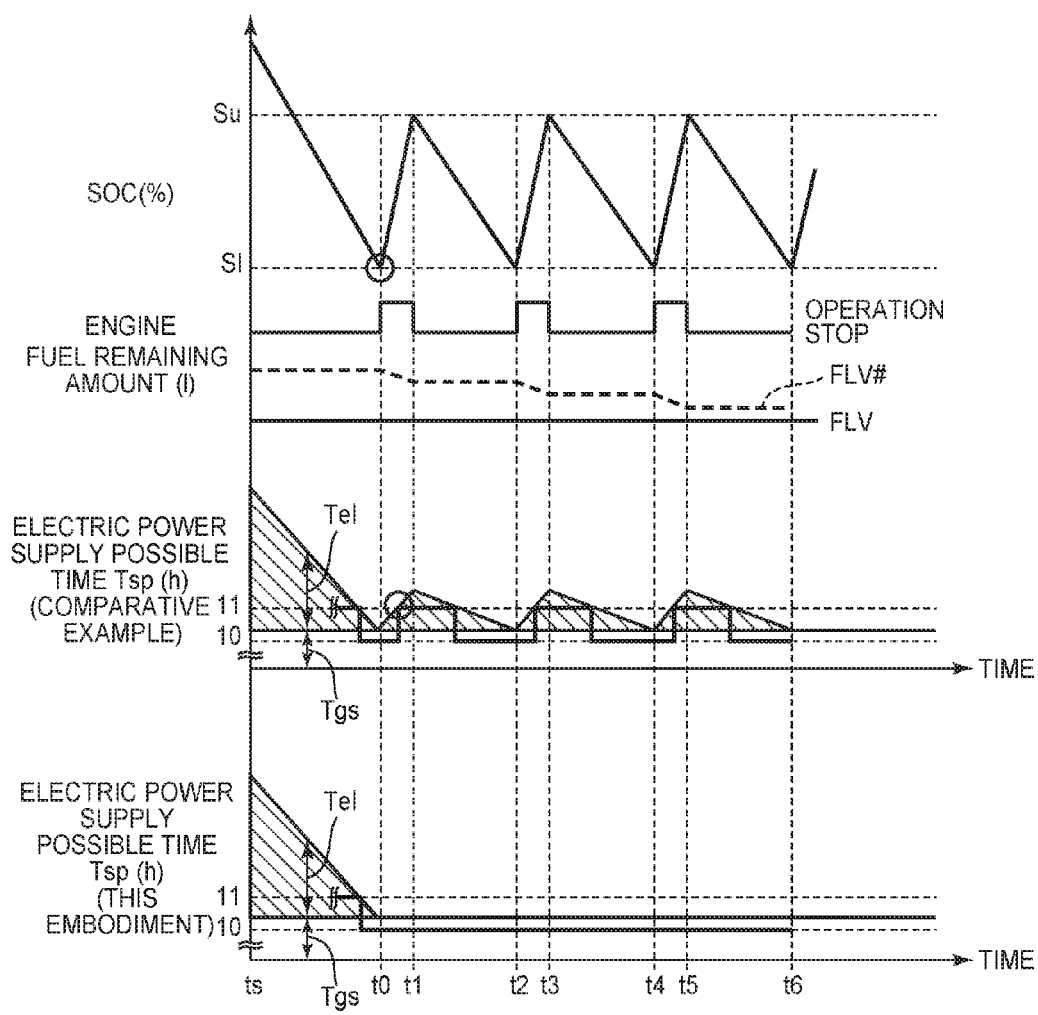
FIG. 3 is a conceptual waveform chart illustrating an example of transitions of a fuel remaining amount and a SOC in the electric power supply mode of the vehicle according to this embodiment and a transition of an electric power supply possible time calculation result with respect thereto.

FIG. 3 is a conceptual waveform chart illustrating an example of transitions of the fuel remaining amount and the SOC in the electric power supply mode and a transition of an electric power supply possible time calculation result with respect thereto. In the operation example that is illustrated in FIG. 3, the supply electric power in the electric power supply mode (that is, electric power consumption by the electric load 600 in FIG. 1) is fixed to a constant value so that the description is simplified.

Referring to FIG. 3, the SOC exceeds the S1 upon the electric power supply being initiated at time ts, and thus the EV electric power supply in which the engine 160 is stopped is executed. The EV electric power supply continues until the SOC reaches the reference value S1 (first reference value) at time t0. During the EV electric power supply, the SOC monotonically decreases in accordance with the supply electric power.

Switching from the EV electric power supply to the HV electric power supply is executed at time t0 by the engine 160 being put into operation. In the example that is illustrated in FIG. 3, the generated electric power resulting from the output of the engine 160 during the HV electric power supply has a fixed value as well, and the generated electric power exceeds the supply electric power.

Accordingly, the SOC rises during the HV electric power supply subsequent to time t0. The HV electric power supply continues until the SOC reaches the reference value Su (second reference value) at time t1. At time t1, switching from the HV electric power supply to the EV electric power supply is executed. Then, the SOC decreases again after time t2.

As described above, switching between the EV electric power supply and the HV electric power supply is executed in accordance with the transition of the SOC. In the operation example that is illustrated in FIG. 3, the HV electric power supply is selected from time t2 to t3 and from time t4 to t5 and the EV electric power supply is selected from time t3 to t4 and from time t5 to t6. Overcharging and overdischarging of the electric power storage device 110 can be prevented in the electric power supply mode by the EV electric power supply or the HV electric power supply being selected in accordance with the flowchart illustrated in FIG. 2 as described above.

A change in the fuel remaining amount in the electric power supply mode is illustrated in FIG. 3, too. In FIG. 3, the fuel remaining amount detection value FLV (discrete value) that is recognized by the ECU 300 and an actual fuel remaining amount FLV# are illustrated along with each other.

During the HV electric power supply, the actual fuel remaining amount FLV# decreases because of the operation of the engine 160. During the EV electric power supply, meanwhile, the fuel remaining amount FLV# does not change. As described above, the engine 160 can be operated while being fixed at the high-efficiency operation point during the HV electric power supply, and thus fuel consumption does not substantially increase.

Accordingly, even if the electric power supply mode in which the EV electric power supply and the HV electric power supply are repeated continues, a case might arise where the SOC repeatedly increases and decreases with the fuel remaining amount detection value FLV recognized by the ECU 300 remaining constant.

The ECU 300 has a function to calculate an electric power supply possible time Tsp that is a remaining time in which electric power supply is possible in the electric power supply mode. The user can be notified of the calculated electric power supply possible time Tsp by the calculated electric power supply possible time Tsp being displayed by the indicator 310 illustrated in FIG. 1. According to FIG. 3, for example, the electric power supply possible time Tsp is displayed every hour.

According to a comparative example, for example, the ECU 300 can calculate the electric power supply possible time Tsp (h) throughout the electric power supply mode in accordance with the sum of an electric power generation possible time Tgs (h) using the fuel in the fuel tank 165 and a discharging possible time Tel (h) using the electric power of the electric power storage device 110.

The electric power generation possible time Tgs (h) can be calculated by a generatable electric power amount (kWh) that is proportional to the fuel remaining amount detection value FLV being divided by a current supply electric power (kW). Likewise, the discharging possible time Tel (h) can be calculated by a dischargeable electric power amount (kWh) that is proportional to the SOC of the electric power storage device 110 being divided by the current supply electric power (kW).

In the example that is illustrated in FIG. 3, the supply electric power is constant, and thus the discharging possible time Tel changes in accordance with the transition of the SOC and the electric power generation possible time Tgs changes in accordance with the transition of the fuel remaining amount detection value FLV.

At this time, in the above-described case where the SOC repeatedly increases and decreases with the fuel remaining amount detection value FLV remaining constant, a phenomenon occurs in which the calculated electric power supply possible time Tsp increases despite the original electric power supply possible time being shortened for fuel consumption.

In a case where the electric power supply possible time Tsp is displayed by the indicator 310 every hour as illustrated in FIG. 3, for example, the user might feel uncomfortable as the displayed value repeatedly increases and decreases amid the continuation of electric power supply (fluctuation between 10 hours and 11 hours). Alternatively, in a case where electric power supply path selection or the like is controlled by the use of the electric power supply possible time Tsp of the vehicle in a power grid, the control operation might become unreasonable due to the fluctuation of the result of the calculation of the electric power supply possible time Tsp.

Accordingly, in the vehicle according to this embodiment, the electric power supply possible time in the electric power supply mode is appropriately calculated in accordance with the control flow that is described below.

Figure 4:
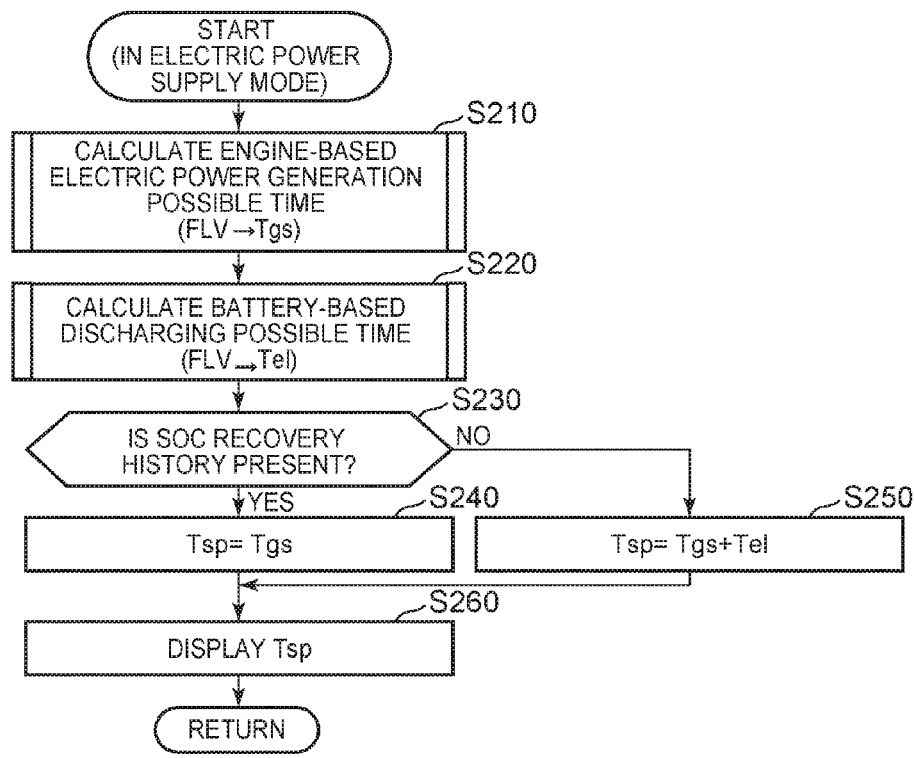
FIG. 4 is a flowchart showing an electric power supply possible time calculation processing according to this embodiment.

FIG. 4 is a flowchart showing an electric power supply possible time calculation processing according to this embodiment.

Referring to FIG. 4, the ECU 300 calculates, in Step S210, the engine-based electric power generation possible time Tgs based on the fuel remaining amount detection value FLV. In addition, the ECU 300 calculates the discharging possible time Tel based on the SOC of the electric power storage device 110 in Step S220.

Figure 5:
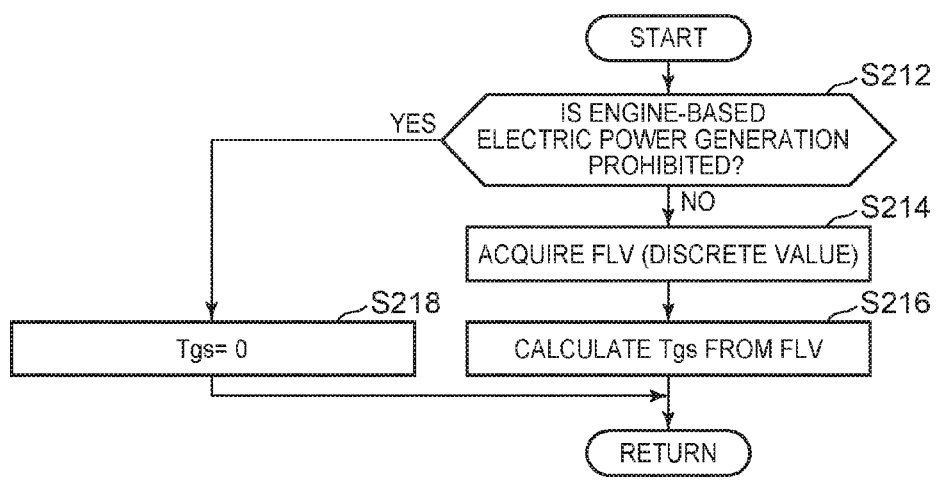
FIG. 5 is a flowchart illustrating details of an electric power generation possible time calculation processing.
Figure 6:
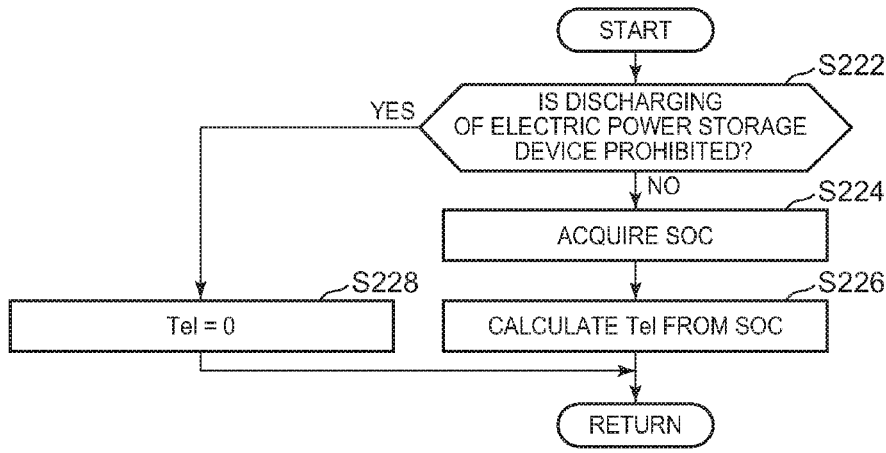
FIG. 6 is a flowchart illustrating details of a discharging possible time calculation processing.

FIGS. 5 and 6 are flowcharts showing details of the electric power generation possible time and discharging possible time calculation processing illustrated in FIG. 4. In other words, FIG. 5 is a flowchart illustrating details of the control processing pertaining to Step S210 in FIG. 4, and FIG. 6 is a flowchart illustrating details of the control processing pertaining to Step S220 in FIG. 4.

Referring to FIG. 5, the ECU 300 determines in Step S212 whether or not the current state is a state where electric power generation by the engine 160 is prohibited. In the case of an abnormality in any one of the engine 160, the motor generators 130, 135, and the PCU 120, for example, the electric power generation by the operation of the engine 160 is prohibited, and thus a YES determination is made in Step S212. When the engine-based electric power generation is prohibited (when a YES determination is made in S212), the ECU 300 allows the processing to proceed to Step S218 and sets the electric power generation possible time Tgs to 0.

In a case where the electric power generation by the operation of the engine 160 is available (when a NO determination is made in S212), the ECU 300 allows the processing to proceed to Step S214 and recognizes the fuel remaining amount detection value FLV based on the output of the fuel gauge 195. In this manner, the fuel remaining amount detection value FLV is acquired as a discrete numerical value.

In Step S216, the ECU 300 calculates the electric power generation possible time Tgs from the fuel remaining amount detection value FLV acquired in Step S214. The generatable electric power amount (kWh) can be calculated from the fuel remaining amount detection value FLV in accordance with, for example, a coefficient that is set in advance based on thermal efficiency of the engine 160, efficiency of electric power generation in the motor generator 130, and efficiency of electric power conversion by the PCU 120 and the electric power converter 200 in the HV electric power supply mode. In addition, the electric power generation possible time Tgs can be calculated by the obtained generatable electric power amount being divided by the current supply electric power.

Referring to FIG. 6, the ECU 300 determines in Step S222 whether or not the discharging from the electric power storage device 110 is prohibited. In a case where the discharging from the battery is prohibited because of an abnormality of the electric power storage device 110 (when a YES determination is made in S222), the ECU 300 allows the processing to proceed to Step S228 and sets the discharging possible time Tel to 0.

In a case where the discharging of the electric power storage device 110 is possible (when a NO determination is made in S222), the ECU 300 allows the processing to proceed to Step S224 and acquires a current SOC in accordance with SOC estimation based on the voltage VB and the current IB of the electric power storage device 110. The SOC estimation may reflect a temperature of the electric power storage device 110 as well.

In Step S226, the ECU 300 calculates the discharging possible time Tel from the SOC acquired in Step S224. The dischargeable electric power amount (kWh) can be calculated from the SOC in accordance with, for example, a coefficient that is set in advance based on the efficiency of the electric power conversion by the electric power converter 200 in the EV electric power supply mode. In addition, the discharging possible time Tel can be calculated by the obtained dischargeable electric power amount being divided by the current supply electric power.

Referring back to FIG. 4, the ECU 300 determines the presence or absence of a SOC recovery history in Step S230 after calculating the electric power generation possible time Tgs and the discharging possible time Tel in Steps S210 and S220.

Simply, the determination of Step S230 can be made based on the presence or absence of the operation history of the engine 160 subsequent to the initiation of the electric power supply mode. In other words, a NO determination can be made in Step S230 in a case where the engine 160 is not operated until the present point in time after the initiation of electric power supply and only the EV electric power supply mode is selected. In contrast, a YES determination can be made in Step S230 provided that at least one period of the operation of the engine 160 is provided until the present point in time after the initiation of the electric power supply and a history of the selection of the HV electric power supply mode remains. Accordingly, the determination according to Step S230 can be executed based on the engine operation history stored in Step S160 illustrated in FIG. 2.

When the SOC recovery history is absent (when a NO determination is made in S230), the ECU 300 allows the processing to proceed to Step S250 and sets the electric power supply possible time Tsp in accordance with the sum of the electric power generation possible time Tgs and the discharging possible time Tel (Tsp=Tgs+Tel). When the electric power supply possible time Tsp is set in Step S250, the ECU 300 allows the processing to proceed to Step S260 and display the electric power supply possible time Tsp on the indicator 310.

When the SOC recovery history is present (when a YES determination is made in S230), the ECU 300 allows the processing to proceed to Step S240 and sets the Tsp to be equal to the Tgs. In other words, the electric power supply possible time Tsp is calculated based solely on fuel remaining amount detection value FLV without the discharging possible time Tel based on the SOC being taken into account. When the electric power supply possible time Tsp is set in Step S240, the ECU 300 allows the processing to proceed to Step S260 and display the electric power supply possible time Tsp on the indicator 310.

Referring back to FIG. 3, in the electric power supply possible time calculation processing according to this embodiment, the operation history of the engine 160 is absent and only the EV electric power supply is selected between time ts, when electric power supply is initiated, and time t0, and thus the electric power supply possible time Tsp is calculated in a similar manner to the comparative example.

In contrast, during the electric power supply subsequent to time t0 when the first HV electric power supply is initiated along with the operation of the engine 160, the electric power supply possible time Tsp is calculated based on the fuel remaining amount detection value FLV without the SOC-based discharging possible time Tel being included (Tsp=Tgs). In other words, in the operation example that is illustrated in FIG. 3, the period of time is to t0 corresponds to a "first period" and the period subsequent to time t0 corresponds to a "second period".

As a result, it is appreciated that the inconvenience of the fluctuation of the electric power supply possible time Tsp is resolved as in the comparative example in the period subsequent to time t0 when the selection of the HV electric power supply mode is initiated. Especially, it is appreciated that the user can be free from the discomfort despite the hourly display of the electric power supply possible time Tsp. In the operation example illustrated in FIG. 3, a further continuation of electric power supply (including the HV electric power supply) causes the electric power supply possible time Tsp to decrease every time a decrease in the fuel remaining amount exceeds the resolution of the fuel remaining amount detection value FLV. In this manner, the user can be appropriately notified of a decrease in the electric power supply possible time Tsp resulting from the continuation of the electric power supply.

As described above, according to the vehicle of this embodiment, the electric power supply possible time can be appropriately calculated for the calculated value of the electric power supply possible time not to increase during the continuation of electric power supply even in a case where the resolution of the recognized value of the fuel remaining amount based on the fuel gauge 195 is coarse in the vehicle 100 that has the mode in which electric power supply involving the operation of the engine 160 is performed.

The unreasonable calculation in which the electric power supply possible time increases, which has been described based on the comparative example in FIG. 3, occurs due to a rise in the SOC in the HV electric power supply mode in which the fuel remaining amount detection value FLU is constant. Accordingly, the above-described inconvenience does not arise, even in the HV electric power supply mode, in a case where the supply electric power exceeds the generated electric power and the SOC does not rise.

Accordingly, the determination of the SOC recovery history according to Step S230 in FIG. 4 can also be executed based on a transition of the actual SOC.

Figure 7:
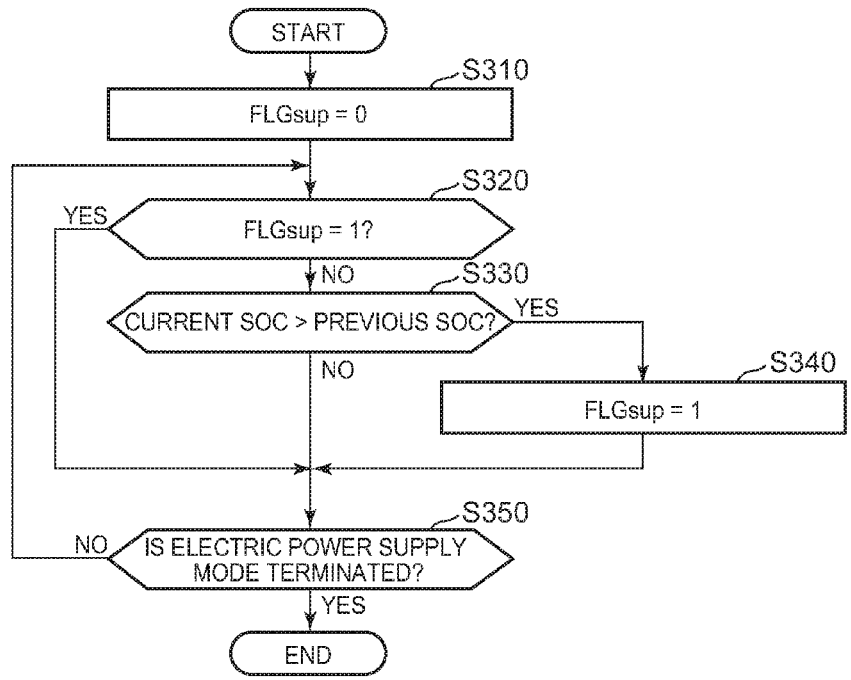
FIG. 7 is a flowchart illustrating another example of a control processing for determining a SOC recovery history.

FIG. 7 is a flowchart illustrating another example of the control processing for determining the SOC recovery history.

Referring to FIG. 7, the ECU 300 initializes a flag FLGsup to 0 in Step S310 after the electric power supply mode is initiated.

In Step S120, the ECU 300 determines whether or not the FLGsup is 1. When the FLGsup is 0 (when a NO determination is made in S320), the ECU 300 compares the SOC of the previous cycle to the current SOC in Step S330.

When the current SOC exceeds the SOC of the previous cycle (when a YES determination is made in S330), the ECU 300 allows the processing to proceed to Step S340 and sets the FLGsup to 1. When the FLGsup is already 1 (when a YES determination is made in S320), the state where the FLGsup is 1 is maintained without the execution of the processing of Step S330 being executed.

When the current SOC is equal to or less than the SOC of the previous cycle (when a NO determination is made in S330), the ECU 300 skips the processing of Step S340. In other words, the state where the FLGsup is 0 is maintained.

In addition, the ECU 300 determines in Step S350 whether or not the electric power supply mode is terminated. The processing of Steps S320 to S340 is periodically executed until the electric power supply mode is terminated (when a NO determination is made in S350).

According to FIG. 7, the flag FLGsup is initially set to 0 when electric power supply is initiated and the FLGsup is maintained at 0 while the SOC monotonically decreases. Once the HV electric power supply mode is selected and the SOC rises at least once because of the supply electric power exceeding the generated electric power, the flag FLGsup is set to 1 thereafter.

Accordingly, the determination pertaining to Step S230 in FIG. 4 can be a NO determination when the FLGsup is 0 and a YES determination when the FLGsup is 1 based on the flag FLGsup set in accordance with the processing illustrated in FIG. 7. Even so, the electric power supply possible time can be appropriately calculated by an increase in the calculated value of the electric power supply possible time during the continuation of electric power supply being avoided.

Figure 8:
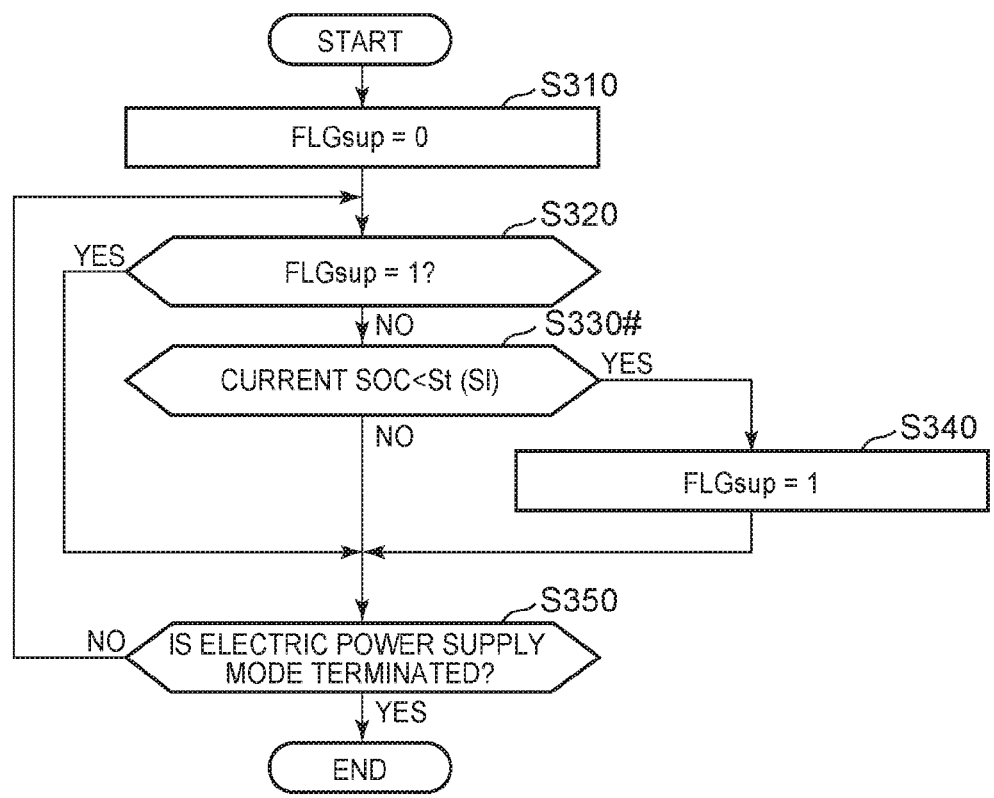
FIG. 8 is a flowchart illustrating yet another example of the control processing for determining the SOC recovery history.

FIG. 8 shows yet another example of the control processing for determining the SOC recovery history. Referring to FIG. 8, the ECU 300 executes the processing of Step S330# instead of Step S330 illustrated in FIG. 7. The other processing of Steps S310, S320, S340, and S350 is similar to that illustrated in FIG. 7, and thus description thereof will not be repeated herein.

In Step S330# that is executed when FLGsup is 0, the ECU 300 determines whether or not the current SOC falls short of a predetermined value St. The predetermined value St is set in correlation with the reference value S1 pertaining to switching from the EV electric power supply to the HV electric power supply. In other words, the St is set to be equal to the S1 in principle, but the St can also be set to a value close to the S1.

According to FIG. 8, the flag FLGsup is initially set to 0 when electric power supply is initiated and the FLGsup is maintained at 0 in a period that continues until the SOC is reduced to a level at which the HV electric power supply is required. Once the SOC is reduced to that level, the flag FLGsup is set to 1 thereafter.

Accordingly, the presence or absence of the SOC recovery history can be determined in Step S230 illustrated in FIG. 4 based on the flag FLGsup according to the processing illustrated in FIG. 8 as well. Even so, the electric power supply possible time can be appropriately calculated by an increase in the calculated value of the electric power supply possible time during the continuation of electric power supply being avoided.

Alternatively, in Step S230 illustrated in FIG. 4, the presence or absence of the SOC recovery history can be determined in a simplified manner based on the current SOC without reference to the past history. As is apparent from FIG. 3, the HV electric power supply is terminated once the SOC rises to the reference value Su and then switching to the EV electric power supply occurs. Accordingly, in a region where the SOC exceeds the Su, it can be determined that no HV electric power supply has been executed and no SOC recovery history has been generated. Meanwhile, in a region where the Su exceeds the SOC, it is possible that the HV electric power supply has been executed. Accordingly, the presence or absence of the SOC recovery history (S230) can also be determined based on the current SOC by comparison to the predetermined value which is set in correlation with the reference value Su. Specifically, a NO determination can be made in S230 (FIG. 4) in a case where the current SOC exceeds the predetermined value (corresponding to the Su) and a YES determination can made otherwise. Then, the presence or absence of the SOC recovery history can be determined in a simplified manner without history accumulation.

In the flowchart that is illustrated in FIG. 4, the electric power generation possible time Tgs and the discharging possible time Tel are calculated in each cycle. However, the execution of the calculation processing regarding the discharging possible time Tel in Step S220 can be omitted as well after the generation of the SOC recovery history, that is, after at least one YES determination is made in Step S230.

In addition, the configuration of the vehicle 100 that is illustrated in FIG. 1 is merely an example, and the configuration for the generation of the supply electric power involving the operation of the engine 160 is not limited to that illustrated in FIG. 1. For example, the present disclosure can be similarly applied to a vehicle that has a so-called series hybrid configuration in which a dedicated generator based on the output of the engine 160 is disposed.

In FIG. 1, a configuration in which the electric power cable 400 serves during both the external charging and external electric power supply is illustrated as an example. However, a cable used during the charging and a cable used during the electric power supply may be separately configured as well.

Likewise, the electric power node for the external electric power supply may be configured to be separate from the inlet 220 although a configuration in which the electric power node for the external electric power supply serves also as the inlet 220 for the external charging has been illustrated as an example. In addition, although a configuration in which electric power is supplied to the outside of the vehicle by the electrical connection by the electric power cable 400 has been illustrated as an example in this embodiment, this embodiment is commonly applicable, insofar as electric power supply following an engine operation is possible, even to an aspect involving no electrical connection with respect to the external electric power supply, examples of which include a system that is executed by non-contact transmission of AC electric power of a predetermined frequency between an electric power transmission coil and an electric power reception coil.

As described above, the "electric power node" may be configured by the use of the electrical outlet 520 in the passenger compartment, and the destination of the electric power supply in the electric power supply mode of the vehicle according to this embodiment may be the outside of the vehicle or the inside of the vehicle (in the passenger compartment).

It should be noted that the embodiment that is disclosed herein is an example and is not restrictive in every aspect. The scope of the present disclosure is to be clarified by not the above description but the scope of claims and is to include any modification that has the same significance as the scope of claims and falls into the same scope as the scope of claims.

What is claimed is:

1. A vehicle having an electric power supply mode, the vehicle comprising:
    an electric power storage device;
    an internal combustion engine configured to generate power by combustion of a fuel;
    a fuel tank configured to store the fuel;
    a fuel gauge configured to detect an amount of the fuel remaining in the fuel tank;
    an electric power generation mechanism configured to generate electric power with the power from the internal combustion engine;
    an electric power converter configured to convert electric power from at least one of the electric power storage device and the electric power generation mechanism to supply electric power in the electric power supply mode;
    an electric power node configured to output the supply electric power from the electric power converter; and
    an electronic control unit configured to put the internal combustion engine into operation and control the operation of the internal combustion engine for electric power supply to continue once an SOC of the electric power storage device is reduced to a first reference value during the electric power supply in which the internal combustion engine is stopped in the electric power supply mode,
    wherein the electronic control unit is configured to: i) calculate an electric power supply possible time based on a remaining amount value recognized as a discrete numerical value based on an output of the fuel gauge and the SOC in a first period between an initiation of the electric power supply and generation of a recovery history in the SOC resulting from charging of the electric power storage device with the electric power from the electric power generation mechanism attributable to the operation of the internal combustion engine in the electric power supply mode, and ii) calculate the electric power supply possible time based on the remaining amount value without taking the SOC into account after the generation of the recovery history.

2. The vehicle according to claim 1, wherein
the electronic control unit is configured to control the operation of the internal combustion engine for the electric power supply to continue with the internal combustion engine stopped once the SOC of the electric power storage device rises to a second reference value higher than the first reference value during the electric power supply involving the operation of the internal combustion engine.

3. The vehicle according to claim 1, wherein
the electronic control unit is configured to detect the recovery history based on an operation history of the internal combustion engine starting from the initiation of the electric power supply.

4. The vehicle according to claim 1, wherein
the electronic control unit is configured to detect the recovery history based on presence or absence of a history of the SOC changing from a decrease to an increase in the electric power supply mode.

5. The vehicle according to claim 1, wherein
the electronic control unit is configured to detect the recovery history based on presence or absence of a history of the SOC being reduced to a predetermined value determined in correlation with the first reference value in the electric power supply mode.

6. The vehicle according to claim 1, further comprising:
an indicator configured to display the electric power supply possible time calculated by the control device in a manner in which a user is capable of viewing the electric power supply possible time.

* * * * *

UNITED STATES PATENT AND TRADEMARK OFFICE
CERTIFICATE OF CORRECTION

PATENT NO. : 9,701,186 B2
APPLICATION NO. : 15/134650
DATED : July 11, 2017
INVENTOR(S) : Yamato Niwa It is certified that error appears in the above-identified patent and that said Letters Patent is hereby corrected as shown below:

In the Specification

In Column 14, Line 8, after "detection value" delete "FLU" and insert --FLV--, therefor.

Signed and Sealed this
Twenty-second Day of August, 2017

Joseph Matal
*Performing the Functions and Duties of the*
*Under Secretary of Commerce for Intellectual Property and*
*Director of the United States Patent and Trademark Office*